(12) United States Patent
Takayama et al.

(10) Patent No.: US 9,740,151 B1
(45) Date of Patent: Aug. 22, 2017

(54) PRINT CONTROL APPARATUS AND METHOD, PRINT SYSTEM, AND NON-TRANSITORY COMPUTER READABLE MEDIUM

(71) Applicant: FUJI XEROX CO., LTD., Tokyo (JP)

(72) Inventors: Naoya Takayama, Kanagawa (JP); Satoshi Kondo, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/215,981

(22) Filed: Jul. 21, 2016

(30) Foreign Application Priority Data

Feb. 12, 2016 (JP) ................... 2016-024771

(51) Int. Cl.
*G03G 15/00* (2006.01)

(52) U.S. Cl.
CPC ........... *G03G 15/50* (2013.01); *G03G 15/652* (2013.01)

(58) Field of Classification Search
CPC .. G03G 15/652; G03G 15/5029; G03G 15/50; G03G 2215/00455
USPC ..................................... 399/69, 82
See application file for complete search history.

(56) References Cited

U.S. PATENT DOCUMENTS

| | | | | |
|---|---|---|---|---|
| 6,980,767 | B1* | 12/2005 | Cahill | G03G 15/6544 399/400 |
| 7,061,635 | B1* | 6/2006 | Wanda | G06F 3/1213 358/1.1 |
| 2006/0269310 | A1* | 11/2006 | German | G03G 15/50 399/82 |

FOREIGN PATENT DOCUMENTS

| | | |
|---|---|---|
| JP | 2005-262486 A | 9/2005 |
| JP | 2006-344106 A | 12/2006 |
| JP | 2013-244656 A | 12/2013 |

* cited by examiner

*Primary Examiner* — Walter L Lindsay, Jr.
*Assistant Examiner* — Jessica L Eley
(74) *Attorney, Agent, or Firm* — Oliff PLC

(57) ABSTRACT

A print control apparatus includes an analyzing unit, an obtaining unit, and a controller. The analyzing unit analyzes a total number of pages of received print data. The obtaining unit obtains number-of-printable-pages information, which is information on a number of pages printable on a bundle of continuous form paper set in a printer that performs printing on continuous form paper. When reference to the number-of-printable-pages information obtained by the obtaining unit and the total number of pages analyzed by the analyzing unit indicates that a print result based on the print data is to be printed on multiple bundles of continuous form paper, the controller controls the printer to print, on at least last two pages of the currently set bundle of continuous form paper, information indicating an order of output of the bundle of continuous form paper.

13 Claims, 11 Drawing Sheets

PRINT CONTROL APPARATUS AND METHOD, PRINT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-024771 filed Feb. 12, 2016.

BACKGROUND (i) Technical Field

The present invention relates to a print control apparatus and method, a print system, and a non-transitory computer readable medium.

(ii) Related Art

A printer that prints on continuous form paper often performs printing based on print data of a great number of pages. Therefore, not the entire print result may be output on one bundle of continuous form paper, and accordingly, the print result may be output on multiple bundles of continuous form paper.

The printed continuous form paper is stacked in such a manner that the firstly printed page becomes the bottom and the lastly printed page becomes the top. Therefore, it is not easy to identify the order of output simply by looking at the bundles of output continuous form paper. In particular, when print data of invoices or the like is printed on continuous form paper, the page number is not printed on the individual pages. Therefore, the order of output is not identifiable only by looking at the bundles of output continuous form paper.

However, if the bundles of printed continuous form paper are not handled in the order of output, the order of pages becomes different from that of the original print data, which may result in a trouble in the processing afterwards.

SUMMARY

According to an aspect of the invention, there is provided a print control apparatus including an analyzing unit, an obtaining unit, and a controller. The analyzing unit analyzes a total number of pages of received print data. The obtaining unit obtains number-of-printable-pages information, which is information on a number of pages printable on a bundle of continuous form paper set in a printer that performs printing on continuous form paper. When reference to the number-of-printable-pages information obtained by the obtaining unit and the total number of pages analyzed by the analyzing unit indicates that a print result based on the print data is to be printed on multiple bundles of continuous form paper, the controller controls the printer to print, on at least last two pages of the currently set bundle of continuous form paper, information indicating an order of output of the bundle of continuous form paper.

BRIEF DESCRIPTION OF THE DRAWINGS

An exemplary embodiment of the present invention will be described in detail based on the following figures, wherein.

DETAILED DESCRIPTION

Next, an exemplary embodiment of the present invention will be described in detail with reference to the drawings.

Figure 1:
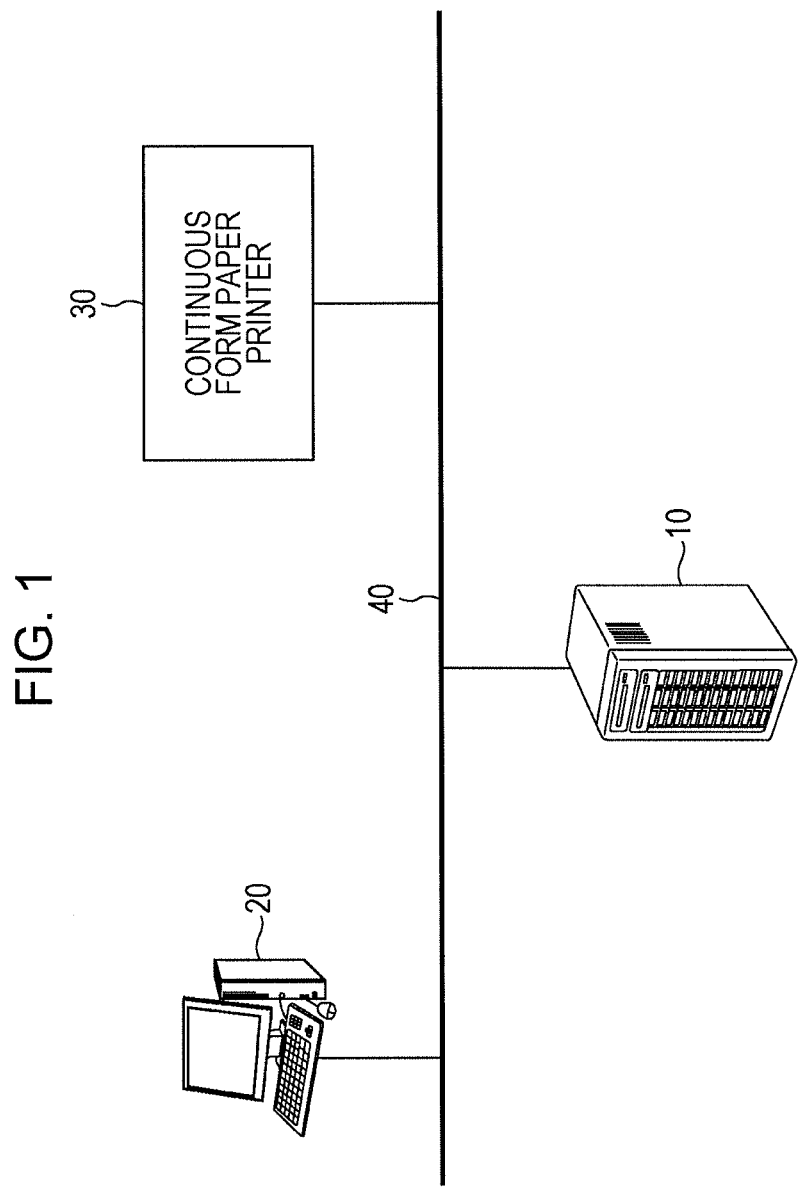
FIG. 1 is a diagram illustrating the system configuration of a print system according to an exemplary embodiment of the present invention.

FIG. 1 is a block diagram illustrating the configuration of a print system according to the exemplary embodiment of the present invention.

The print system according to the exemplary embodiment of the present invention includes a print server (print control apparatus) 10, a terminal apparatus 20, and a continuous form paper printer 30 which is a printer that performs printing on continuous form paper, which are connected to one another via a network 40, as illustrated in FIG. 1. The terminal apparatus 20 generates print data and transmits the generated print data to the print server 10 via the network 40. The print server 10 accepts the print data transmitted from the terminal apparatus 20, and controls the continuous form paper printer 30 to print an image in accordance with the print data on continuous form paper.

The term "continuous form paper" refers to paper capable of being folded in units of pages that are perforated to be separable at fold lines, and this paper is different from a so-called paper roll that is continuous paper without any fold lines.

Figure 2:
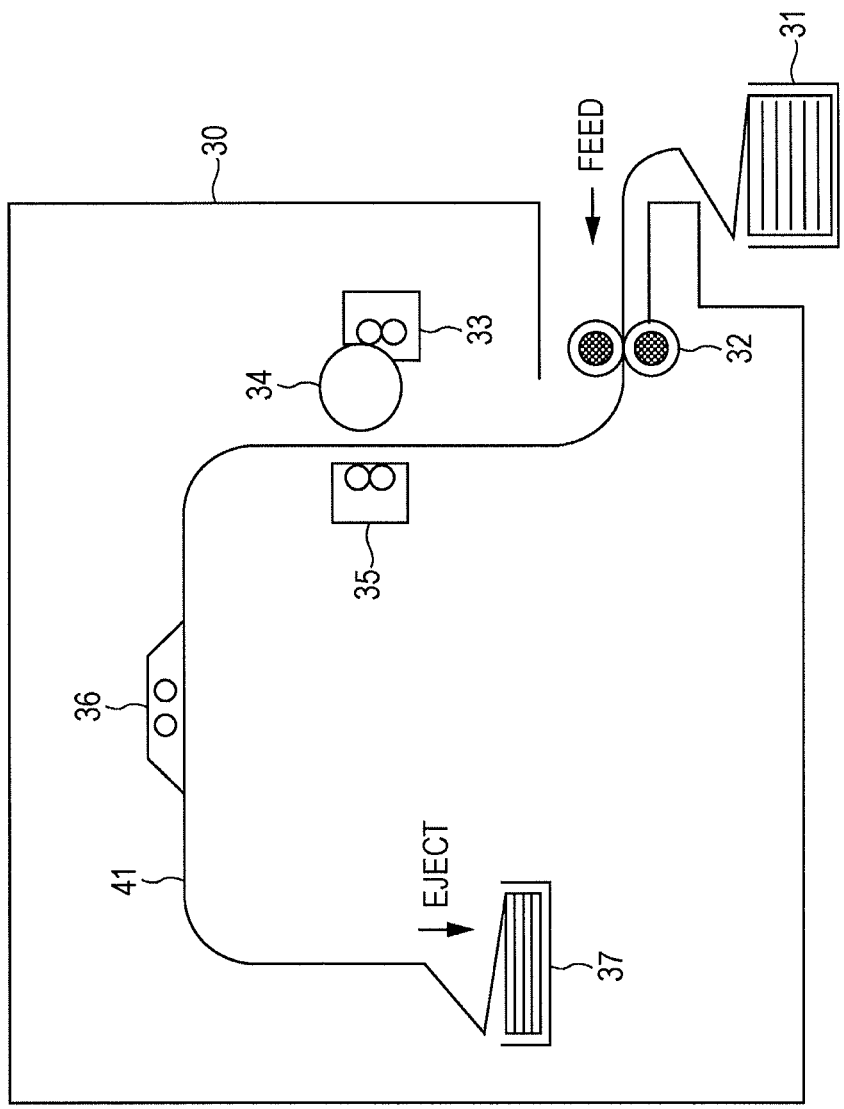
FIG. 2 is a diagram illustrating a specific exemplary configuration of a continuous form paper printer according to the exemplary embodiment of the present invention.

Next, FIG. 2 illustrates a specific exemplary configuration of the continuous form paper printer 30 of the exemplary embodiment.

The continuous form paper printer 30 of the exemplary embodiment includes a hopper 31, a conveying roller 32, a developer 33, a photoconductive drum 34, a transfer unit 35, a fixing unit 36, and a stacker 37, as illustrated in FIG. 2.

The developer 33 develops an electrostatic latent image formed on the photoconductive drum 34. The transfer unit 35 transfers a toner image on the photoconductive drum 34, developed by the developer 33, to continuous form paper 41. The toner image transferred to the continuous form paper 41 is fixed by the fixing unit 36.

The continuous form paper printer 30 is configured as follows. That is, the continuous form paper 41 accommodated in the hopper 31 is fed from a paper feed port. Printing is performed on the fed continuous form paper 41 while the continuous form paper is conveyed on a paper transport path. The continuous form paper 41 is folded and ejected onto the stacker 37.

Figure 3:
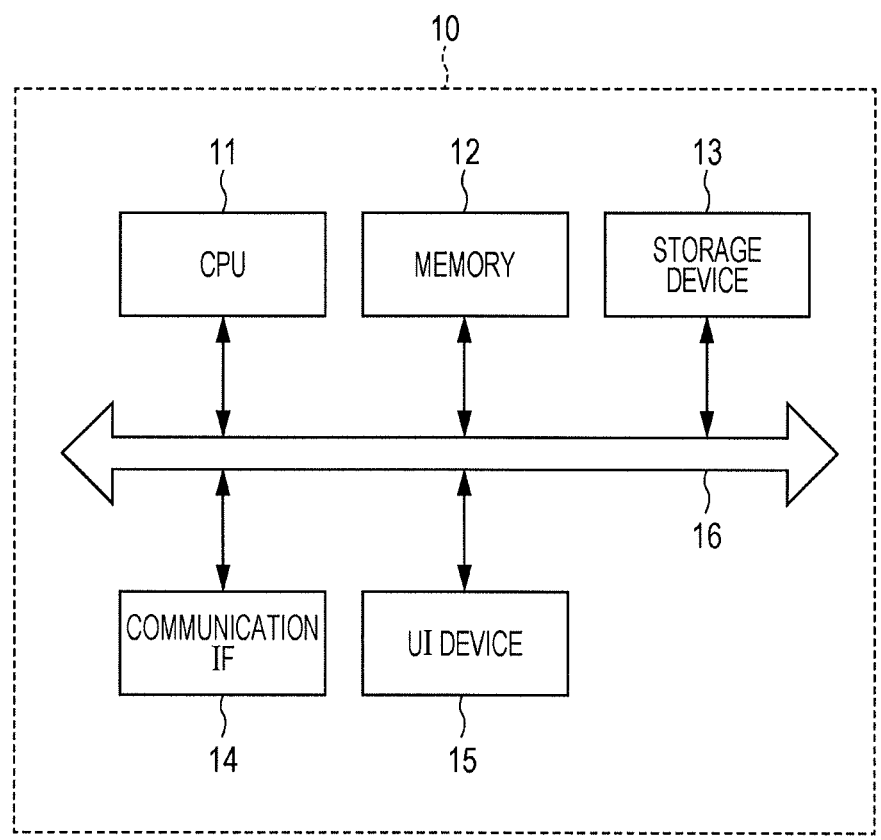
FIG. 3 is a block diagram illustrating the hardware configuration of a print server according to the exemplary embodiment of the present invention.

Next, FIG. 3 illustrates the hardware configuration of the print server 10 in the print system according to the exemplary embodiment.

The print server 10 includes a central processing unit (CPU) 11, a memory 12, a storage device 13 such as a hard disk drive (HDD), a communication interface (IF) 14 that performs transmission and reception of data to and from an external apparatus via the network 40, and a user interface (UI) device 15 including a touchscreen, or a liquid crystal display and a keyboard, as illustrated in FIG. 3. These elements are connected to one another via a control bus 16.

The CPU 11 executes a certain process based on a control program stored in the memory 12 or the storage device 13, and controls the operation of the print server 10. Although the exemplary embodiment has discussed that the CPU 11 reads and executes the control program stored in the memory 12 or the storage device 13, the program may be stored in a storage medium such as a compact-disc read-only memory (CD-ROM) and may be provided to the CPU 11.

Figure 4:
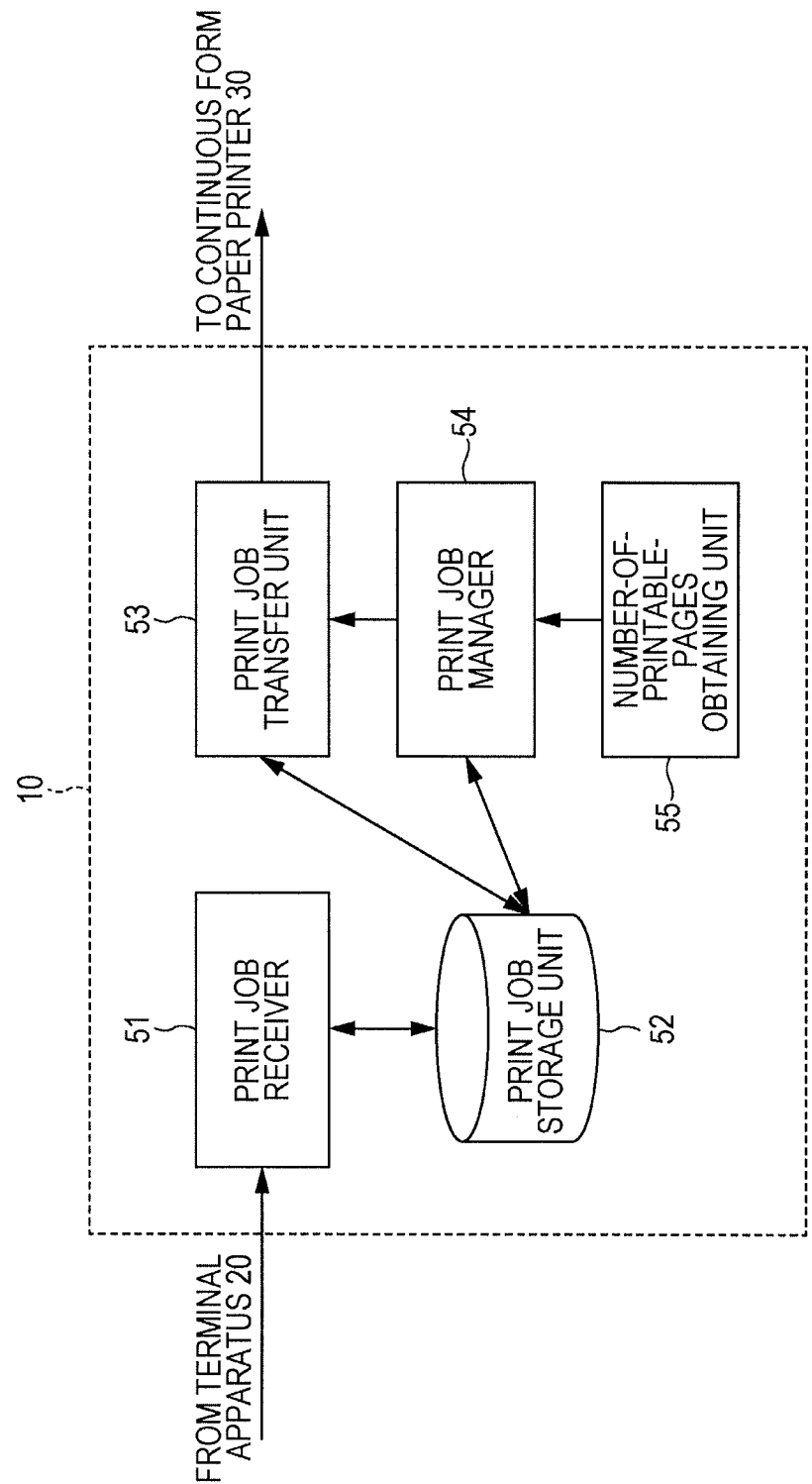
FIG. 4 is a block diagram illustrating the functional configuration of the print server according to the exemplary embodiment of the present invention.

FIG. 4 is a block diagram illustrating the functional configuration of the print server 10 realized by execution of the above-mentioned control program.

The print server 10 of the exemplary embodiment includes a print job receiver 51, a print job storage unit 52, a print job transfer unit 53, a print job manager 54, and a number-of-printable-pages obtaining unit 55, as illustrated in FIG. 4.

The print job receiver 51 receives a print job (print data) for printing with the continuous form paper printer 30 from the terminal apparatus 20.

The print job storage unit 52 stores the print job received by the print job receiver 51.

The print job transfer unit 53 transfers the print job stored in the print job storage unit 52 to the continuous form paper printer 30 in units of pages.

The number-of-printable-pages obtaining unit 55 obtains number-of-printable-pages information, which is information on the number of pages printable on a bundle of continuous form paper currently set in the continuous form paper printer 30.

In this case, the number-of-printable-pages obtaining unit 55 may obtain the number-of-printable-pages information from the continuous form paper printer 30 via the network 40.

Alternatively, the number-of-printable-pages obtaining unit 55 may obtain the number-of-printable-pages information by receiving, on the basis of a user operation, information on the number of pages printable on one bundle of continuous form paper. For example, when one bundle of continuous form paper has continuous forms of 2000 pages, the user inputs the value "2000" via a user interface. The number-of-printable-pages obtaining unit 55 may obtain this "2000" pages as the number-of-printable-pages information.

When printing of print data starts in the middle of one bundle of continuous form paper, the number of pages of one bundle of continuous form paper does not directly be the number of printable pages. In such a case, the number-of-printable-pages obtaining unit 55 calculates the number of output pages output by the continuous form paper printer 30 after replacement of the continuous form paper, calculates the number of remaining pages of a bundle of continuous form paper set in the continuous form paper printer 30 from the number of pages printable on one bundle of continuous form paper and the calculated number of output pages, and obtains this number of remaining pages as the number-of-printable-pages information.

The print job manager 54 manages page information of the print job transferred by the print job transfer unit 53.

The print job manager 54 also analyzes the total number of pages of the print job received by the print job receiver 51 and stored in the print job storage unit 52. Referring to the number-of-printable-pages information obtained by the number-of-printable-pages obtaining unit 55 and the analyzed total number of pages, the print job manager 54 determines whether a print result based on the print job is to be printed on multiple bundles of continuous form paper. When it is determined that a print result based on the print job is to be printed on multiple bundles of continuous form paper, the print job manager 54 controls the print job transfer unit 53 to control the continuous form paper printer 30 to print, on at least the last two pages of the currently set bundle of continuous form paper, information indicating the order of output of the bundle of continuous form paper.

The information indicating the order of output of the bundle of continuous form paper may include information on the total number of bundles of continuous form paper output by executing this print job.

The print job manager 54 is able to calculate the total number of bundles of continuous form paper necessary for printing the print job, from the analyzed total number of pages of the print job and the number of pages printable on one bundle of continuous form paper. For example, when the total number of pages of a print job to be printed is 50000 pages and when one bundle of continuous form paper has continuous forms of 2000 pages, the total number of bundles of continuous form paper necessary for printing this print job is calculated as 26 (50000/1998≈25.03). Since the case is described here where the information indicating the order of output of each bundle of continuous form paper is printed as a banner sheet on the last two pages of the bundle of continuous form paper, the total number of necessary bundles of continuous form paper is calculated by performing division by 1998 pages, which is obtained by subtracting 2 from 2000, which is the number of pages of one bundle of continuous form paper.

Next, the operation of the print system according to the exemplary embodiment will be described in detail with reference to the drawings.

Figure 5:
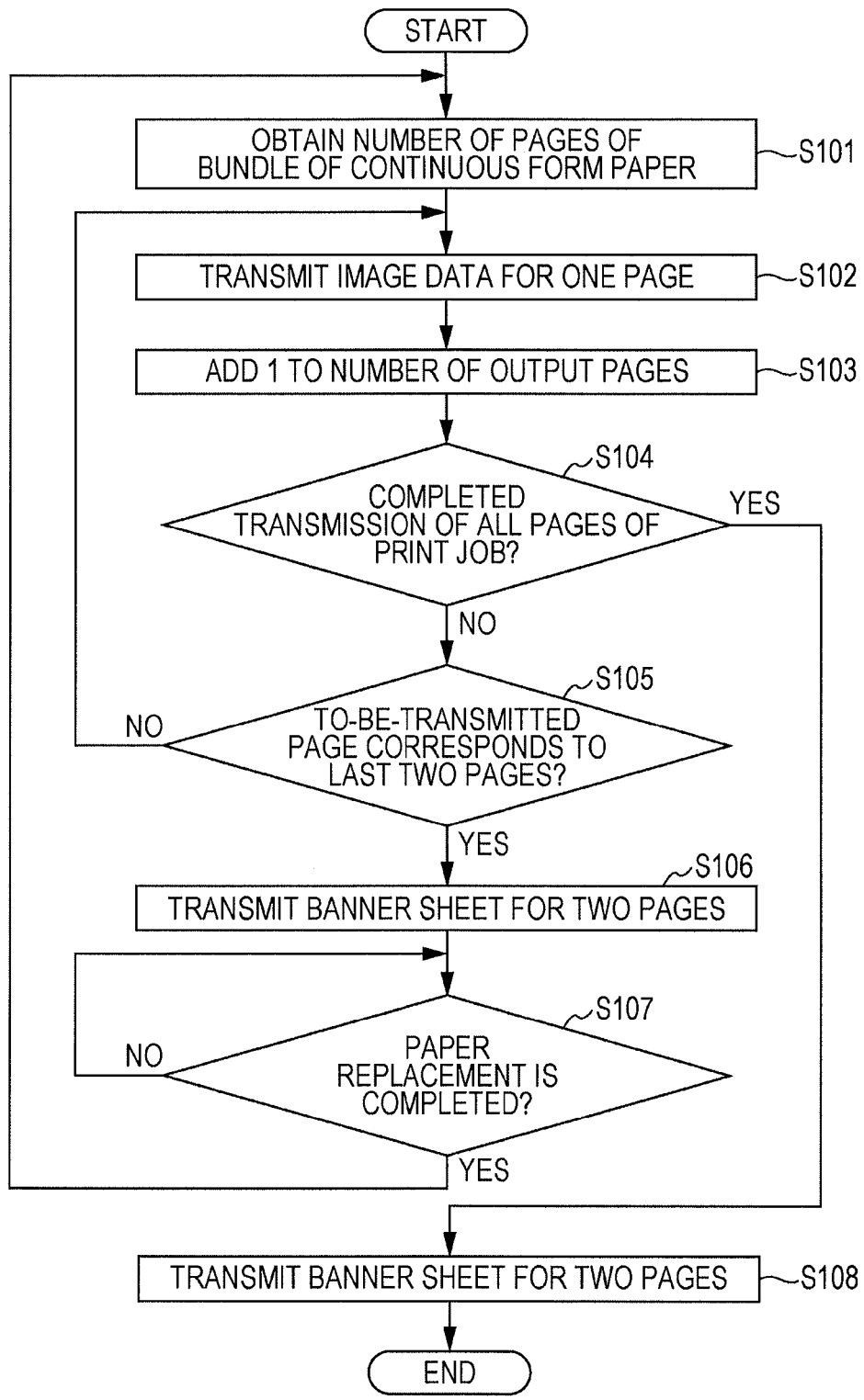
FIG. 5 is a flowchart illustrating the operation of the print server according to the exemplary embodiment of the present invention.

FIG. 5 is a flowchart for describing the operation of the print system according to the exemplary embodiment. Hereinafter, the operation in the case where the total number of pages of a print job to be printed exceeds the number of pages of one bundle of continuous form paper will be described. Specifically, the total number of pages of the print job is 50000 pages, and the number of pages of one bundle of continuous form paper is 2000 pages.

At first, the number-of-printable-pages obtaining unit 55 obtains, for example, the value "2000", which is the number of pages of one bundle of continuous form paper, from the continuous form paper printer 30 as the number of printable pages (step S101). Alternatively, the user may input the value "2000", and the number-of-printable-pages obtaining unit 55 may obtain the value "2000" as the number of printable pages. Alternatively, the user may operate an operation screen and input the model number of continuous form paper, and the number-of-printable-pages obtaining unit 55 may obtain the number of printable pages which is described in advance in a memory or the like in association with the model number of continuous form paper.

The print job manager 54 controls the print job transfer unit 53, thereby transferring image data for one page to the continuous form paper printer 30 (step S102), and 1 is added to the number of output pages (step S103). It is determined whether transmission of all the pages of the print job is completed (step S104). When transmission of all the pages of the print job is not completed, it is determined whether the page to be transmitted next is to be printed on the last two pages of the bundle of continuous form paper (step S105).

Specifically, since the number of pages of one bundle of continuous form paper is 2000, the last two pages mean page 1999 and page 2000.

When the page to be transmitted next does not correspond to a page to be printed on the last two pages, the processing in steps S102 to S104 is repeated.

When the page to be transmitted next corresponds to a page to be printed on the last two pages, namely, pages 1999 and 2000, of the bundle of continuous form paper (YES in step S105), the print job manager 54 controls the print job transfer unit 53 to transfer, instead of the normal image data, print data for two pages for printing a banner sheet including information that indicates the order of output of the bundle of continuous form paper and information on the total number of bundles of continuous form paper (step S106).

Figure 6:
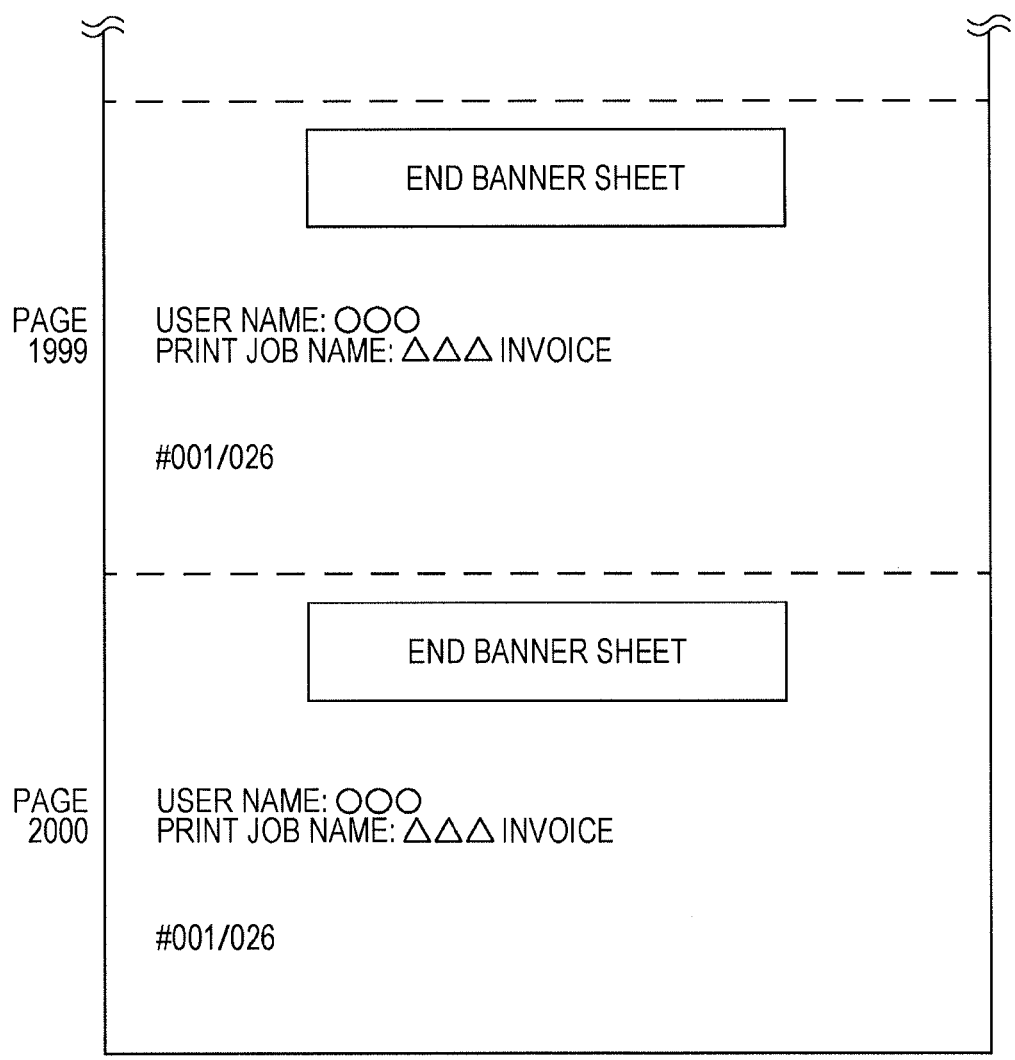
FIG. 6 is a diagram illustrating an exemplary print of a banner sheet for two pages, printed on a first bundle of continuous form paper according to the exemplary embodiment of the present invention.

FIG. 6 illustrates an exemplary print of the banner sheet for two pages, printed by performing such control. In FIG. 6, the title "END BANNER SHEET", information including the user name and the print job name, and the numerals "#001/026" are printed on page 1999 and page 2000.

Figure 7:
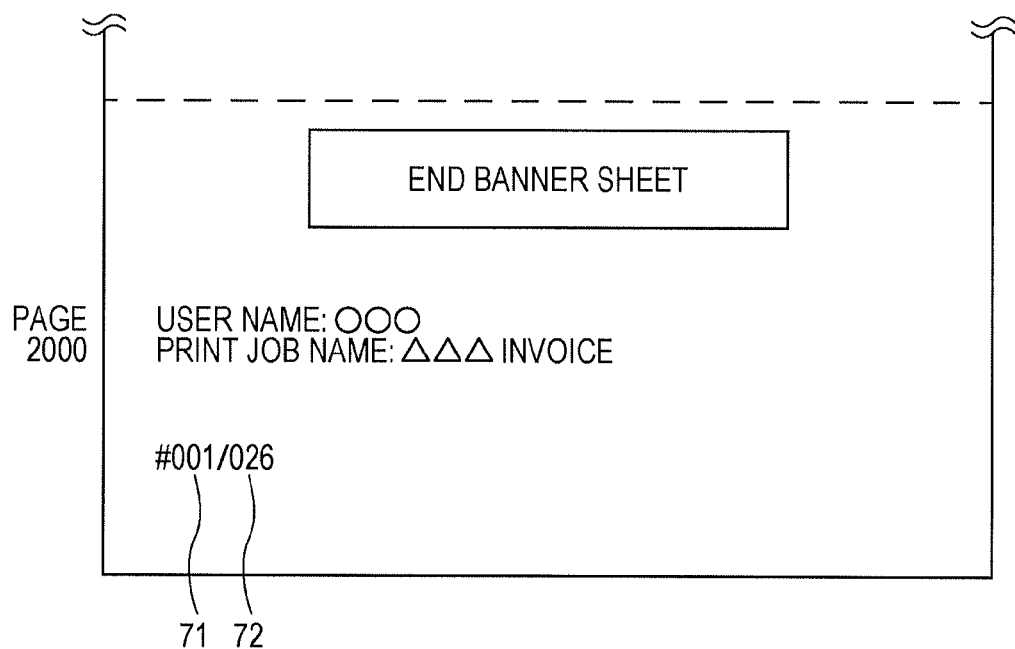
FIG. 7 is a diagram for describing order-of-output information and total-number-of-bundles information printed on the banner sheet.

As illustrated in FIG. 7, the numeral "#001" is order-of-output information 71 indicating the order of output of the bundle of continuous form paper, and the numeral "026" is total-number-of-bundles information 72 indicating the total number of bundles of continuous form paper.

In other words, by referring to the banner sheet illustrated in FIG. 7, the user is able to know that the order of output of this bundle of continuous form paper is the first out of to-be-printed bundles (boxes) of continuous form paper that are 26 in total.

When printing of the banner sheet for two pages is completed, the continuous form paper printer 30 runs out of continuous form paper, and printing is interrupted. Therefore, paper is replaced in the continuous form paper printer 30. When the replacement of paper is completed (YES in step S107), the processing in steps S101 to S106 is repeated.

Figure 8:
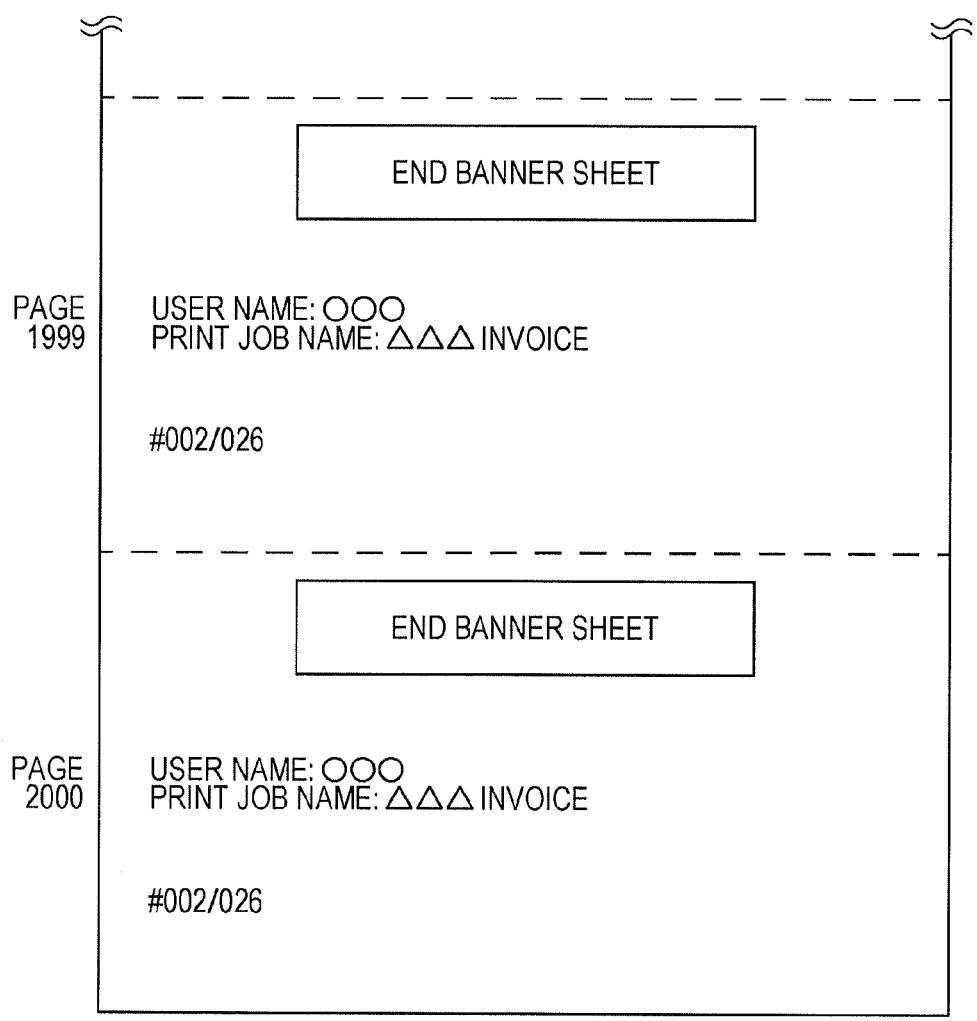
FIG. 8 is a diagram illustrating an exemplary print of the banner sheet for two pages, printed on a second bundle of continuous form paper according to the exemplary embodiment of the present invention.

FIG. 8 illustrates an exemplary print in the case where the banner sheet is printed on the last two pages of a second bundle of continuous form paper. The example illustrated in FIG. 8 is the exemplary print result on the second bundle (box) of continuous form paper. Thus, the numeral "#002" is printed as the order-of-output information 71.

Whenever a bundle of continuous form paper is replaced with new one, the order-of-output information 71 indicating the order of output of that new bundle of continuous form paper and the total-number-of-bundles information 72 are printed on the last two pages of that bundle of continuous form paper.

When printing of all the pages of the print job is completed in the middle of the above-mentioned process (YES in step S104), the print job manager 54 controls the print job transfer unit 53 to transmit the banner sheet for two pages after completion of printing of all the pages of the print job, and ends the process (step S108). The information "#026/026" is printed on the banner sheet on the last two pages of the last bundle of continuous form paper.

The reason for printing the banner sheet with the same details on the last two pages of each bundle of continuous form paper will be described with reference to FIGS. 9 to 12.

Continuous form paper has a folded structure where the pages are alternately mountain-folded and valley-folded. Therefore, whether the last page is to be valley-folded or mountain-folded is unidentifiable.

Figure 9:
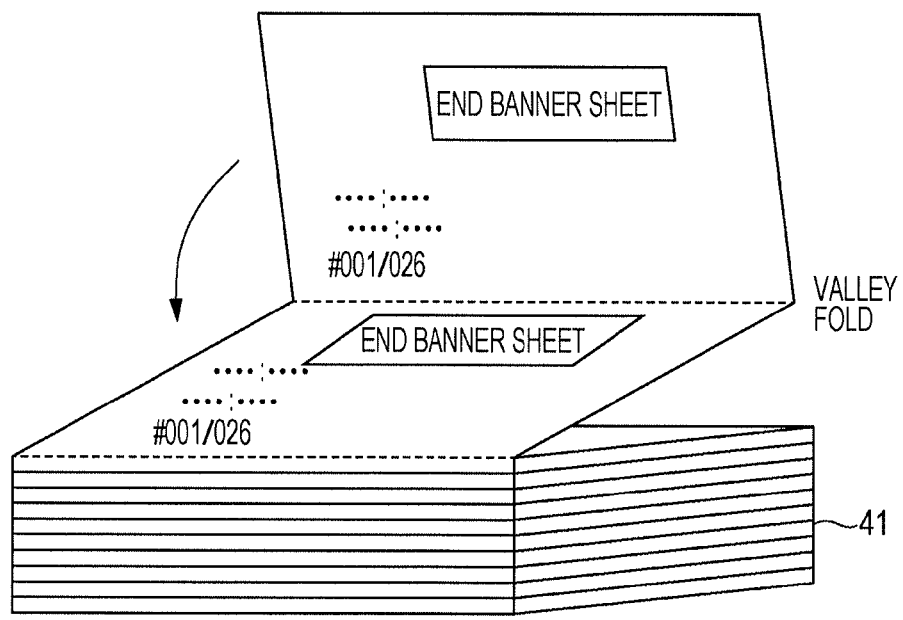
FIG. 9 is a diagram illustrating the case where, when the banner sheet is printed on the last two pages, the last page is valley-folded.
Figure 10:
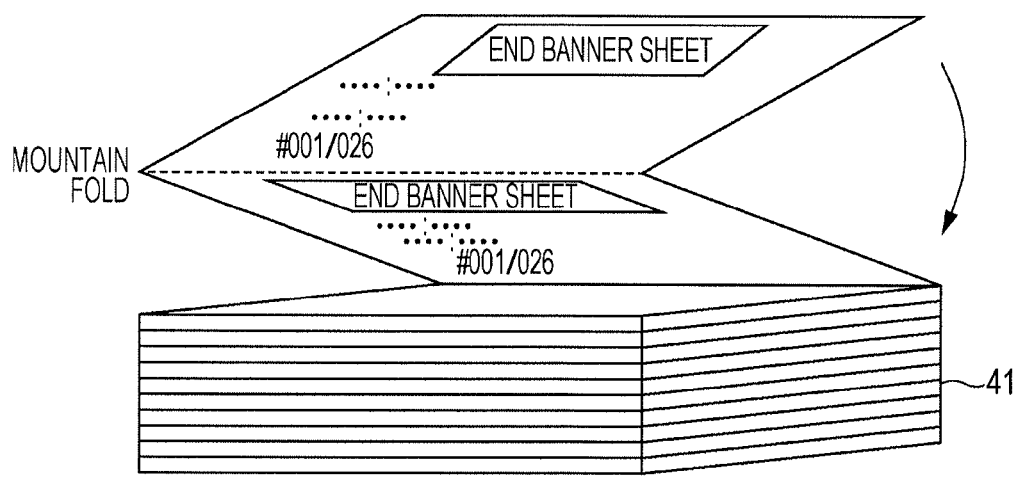
FIG. 10 is a diagram illustrating the case where, when the banner sheet is printed on the last two pages, the last page is mountain-folded.

When the banner sheet is printed on the last two pages, FIG. 9 illustrates the case where the last page is valley-folded, and FIG. 10 illustrates the case where the last page is mountain-folded.

Figure 11:
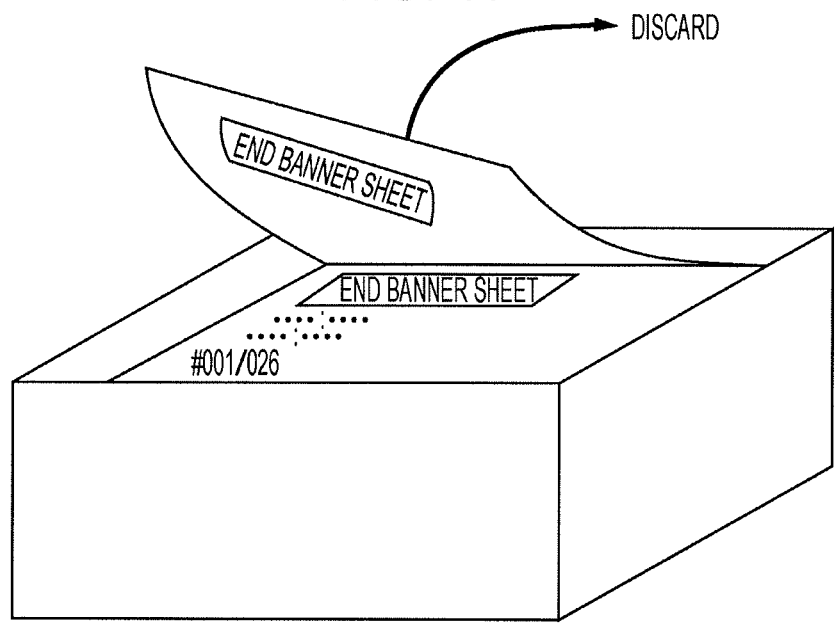
FIG. 11 is a diagram illustrating the case where, when the last page is valley-folded as illustrated in FIG. 9, the last page is arranged facing back at the top of the bundle of continuous form paper.

When the last page is valley-folded as illustrated in FIG. 9, the last page is arranged facing back at the top of the bundle of continuous form paper, as illustrated in FIG. 11. However, the front side of the banner sheet appears by discarding this last page, as illustrated in FIG. 11.

Figure 12:
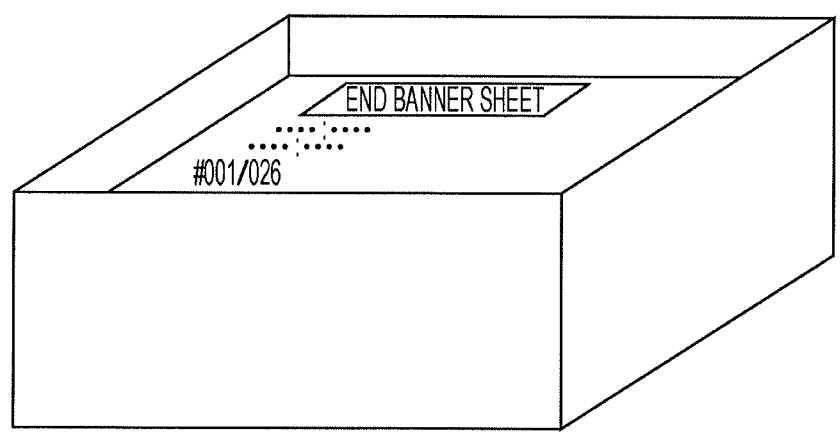
FIG. 12 is a diagram illustrating the case where, when the last page is mountain-folded as illustrated in FIG. 10, the last page is arranged facing front at the top of the bundle of continuous form paper.

When the last page is mountain-folded as illustrated in FIG. 10, the last page is arranged facing front at the top of the bundle of continuous form paper, as illustrated in FIG. 12. Therefore, the front side of the banner sheet appears without having the user discard the last page, as illustrated in FIG. 12.

Figure 13:
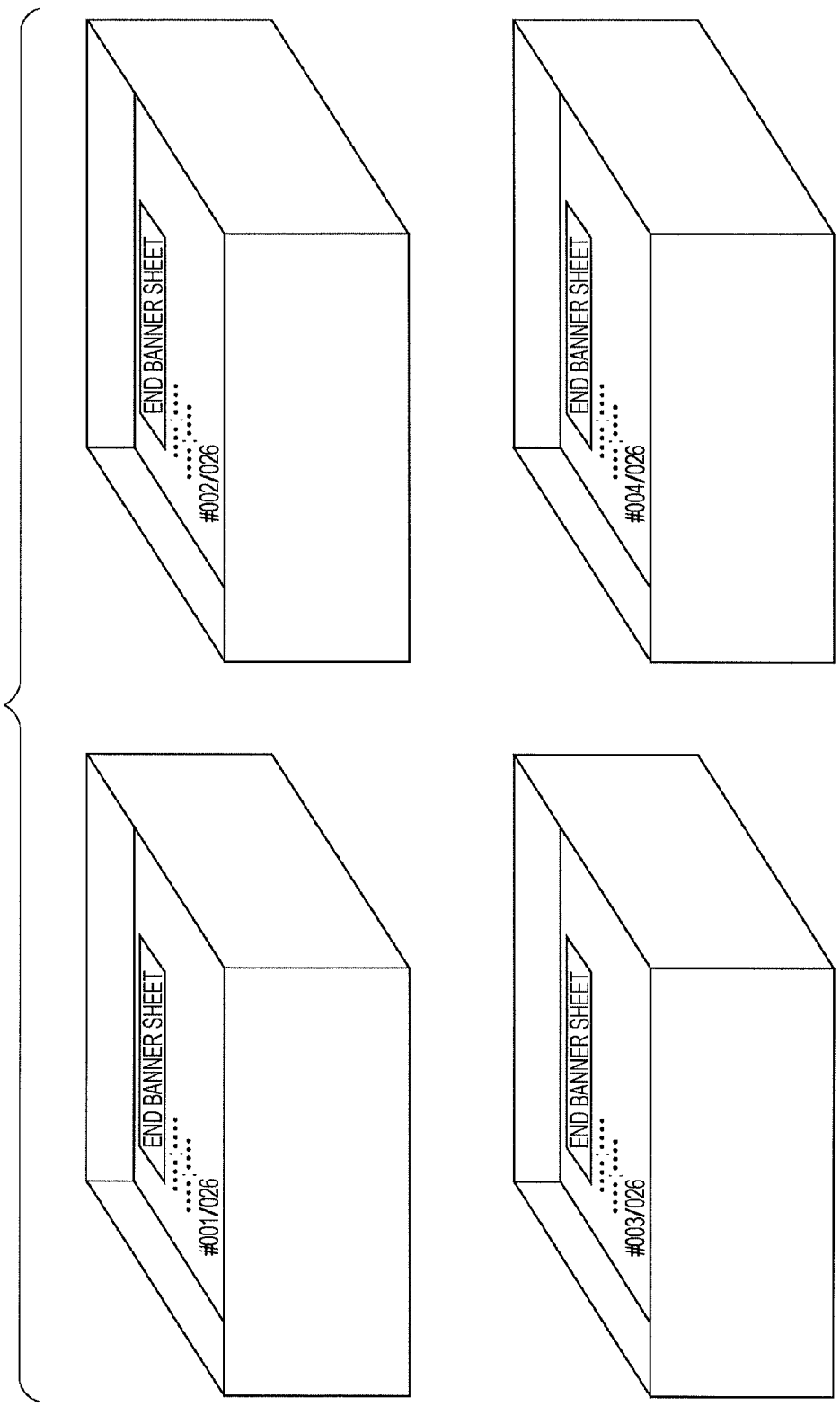
FIG. 13 is a diagram illustrating the case where the banner sheet, on which information indicating the order of output of each of bundles of continuous form paper is printed, is arranged facing front at the top of the bundles of continuous form paper.

In other words, the banner sheet with the same details is printed on the last two pages of each bundle of printed continuous paper as in the exemplary embodiment, and, when a page at the top of a bundle of continuous form paper is blank meaning the back side, the user cuts off and discards that blank page. Accordingly, as illustrated in FIG. 13, the banner sheet, on which information indicating the order of output of each bundle of continuous form paper is printed, is arranged facing front at the top of all bundles of continuous form paper.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A print control apparatus comprising:
an analyzing unit that analyzes a total number of pages of received print data;
an obtaining unit that obtains number-of-printable-pages information, which is information on a number of pages printable on a bundle of continuous form paper set in a printer that performs printing on continuous form paper; and a controller that, when reference to the number-of-printable-pages information obtained by the obtaining unit and the total number of pages analyzed by the analyzing unit indicates that a print result based on the print data is to be printed on a plurality of bundles of continuous form paper, controls the printer to print, on at least the last two consecutive pages of the currently set bundle of continuous form paper, information indicating an order of output of the bundle of continuous form paper.

2. The print control apparatus according to claim 1, wherein the information indicating the order of output of the bundle of continuous form paper includes information on a total number of bundles of continuous form paper to be output by executing the print job.

3. The print control apparatus according to claim 2, further comprising:

a calculation unit that calculates a total number of bundles of continuous form paper necessary for printing the print data, from the total number of pages analyzed by the analyzing unit, and a number of pages printable on one bundle of continuous form paper.

4. The print control apparatus according to claim 3, wherein the obtaining unit obtains the number-of-printable-pages information from the printer.

5. The print control apparatus according to claim 3, wherein the obtaining unit obtains the number-of-printable-pages information by receiving, on the basis of a user operation, information on a number of pages printable on one bundle of continuous form paper.

6. The print control apparatus according to claim 3, further comprising:

a computation unit that computes a number of output pages output by the printer after replacement of continuous form paper, wherein the obtaining unit calculates a number of remaining pages of a bundle of continuous form paper set in the printer from a number of pages printable on one bundle of continuous form paper and the number of output pages computed by the computation unit, and obtains the number of remaining pages as the number-of-printable-pages information.

7. The print control apparatus according to claim 1, wherein the obtaining unit obtains the number-of-printable-pages information from the printer.

8. The print control apparatus according to claim 7, further comprising:

a computation unit that computes a number of output pages output by the printer after replacement of continuous form paper, wherein the obtaining unit calculates a number of remaining pages of a bundle of continuous form paper set in the printer from a number of pages printable on one bundle of continuous form paper and the number of output pages computed by the computation unit, and obtains the number of remaining pages as the number-of-printable-pages information.

9. The print control apparatus according to claim 1, wherein the obtaining unit obtains the number-of-printable-pages information by receiving, on the basis of a user operation, information on a number of pages printable on one bundle of continuous form paper.

10. The print control apparatus according to claim 9, further comprising:

a computation unit that computes a number of output pages output by the printer after replacement of continuous form paper, wherein the obtaining unit calculates a number of remaining pages of a bundle of continuous form paper set in the printer from a number of pages printable on one bundle of continuous form paper and the number of output pages computed by the computation unit, and obtains the number of remaining pages as the number-of-printable-pages information.

11. The print control apparatus according to claim 1, further comprising:

a computation unit that computes a number of output pages output by the printer after replacement of continuous form paper, wherein the obtaining unit calculates a number of remaining pages of a bundle of continuous form paper set in the printer from a number of pages printable on one bundle of continuous form paper and the number of output pages computed by the computation unit, and obtains the number of remaining pages as the number-of-printable-pages information.

12. A print system comprising:

a printer that performs printing on continuous form paper; and a print control apparatus including an analyzing unit that analyzes a total number of pages of received print data, an obtaining unit that obtains number-of-printable-pages information, which is information on a number of pages printable on a bundle of continuous form paper set in the printer, and a controller that, when reference to the number-of-printable-pages information obtained by the obtaining unit and the total number of pages analyzed by the analyzing unit indicates that a print result based on the print data is to be printed on a plurality of bundles of continuous form paper, controls the printer to print, on at least the last two consecutive pages of the currently set bundle of continuous form paper, information indicating an order of output of the bundle of continuous form paper.

13. A non-transitory computer readable medium storing a program causing a computer to execute a process, the process comprising:

analyzing a total number of pages of received print data;

obtaining number-of-printable-pages information, which is information on a number of pages printable on a bundle of continuous form paper set in a printer that performs printing on continuous form paper; and when reference to the obtained number-of-printable-pages information and the analyzed total number of pages indicates that a print result based on the print data is to be printed on a plurality of bundles of continuous form paper, controlling the printer to print, on at least the last two consecutive pages of the currently set bundle of continuous form paper, information indicating an order of output of the bundle of continuous form paper.

* * * * *